UNITED STATES PATENT OFFICE 2,632,019

ALKYL ESTERS OF PHOSPHONO BIS BETA CYANOETHYL ACETIC ACID AND ACETIC ACID NITRILE

Elbert C. Ladd, Passaic, N. J., assignor to United States Rubber Company, New York, N. Y., a corporation of New Jersey No Drawing. Application March 30, 1951, Serial No. 218,520

3 Claims. (Cl. 260—461)

This invention relates to improvements in chemicals.

More particularly, the present invention relates to the alkyl esters of bis(beta-cyanoethyl) phosphono acetic acid and of bis(beta-cyanoethyl) acetonitrile, which can be represented by the formula

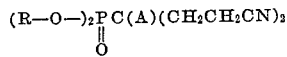

in which R is alkyl, and A is —CN or —COOR. They are prepared by reacting one mole of the corresponding esters of phosphonoacetic acid or of phosphonoacetonitrile with two molecular proportions of acrylonitrile.

The reaction is accomplished by adding (preferably stepwise) two moles of the acrylonitrile to one mole of the organo-phosphorus compound. An alkaline catalyst is usually required and may be added to the organo-phosphorus compound prior to the addition of the olefinic compound.

The reaction is usually exothermic and the temperature may be controlled within a convenient range (25° C.–75° C.) by controlling the rate of addition of the acrylonitrile or by cooling, as required. Solvents may be used to moderate the reaction; for example, toluene, benzene, dioxane, tertiary butyl alcohol, or others which do not interfere with the reaction. After addition of the acrylonitrile is complete the reaction mixture may be heated (e. g., as high as 100° C.–150° C.) for a time (one-half to four hours) to insure completeness of the reaction. Products are isolated by fractional distillation or crystallization.

Suitable alkaline catalysts for the reaction include the oxides, hydroxides, alkoxides, hydrides, cyanides and amides of the alkali metals sodium and potassium, as well as these metals themselves. Organic bases, particularly the strongly basic quaternary ammonium hydroxides, may also be used; for example, trimethylbenzylammonium hydroxide.

The products are useful in the formulation of plasticizers, flame-proofing agents and solvents, and as intermediates for further synthesis. For example, they may be added to polyvinyl chloride, and to rubbery copolymers of butadiene and acrylonitrile, as plasticizers or solvents.

The following examples illustrate my invention:

EXAMPLE 1

(a) *Preparation of intermediate.*—Eighty-three grams of triethylphosphite and 37.75 grams of chloroacetonitrile are placed in a round bottom flask under a water-cooled reflux condenser, which condenser is connected to the atmosphere via a "Dry Ice" trap. The flask is heated at 130° C.–170° C. for about four hours, during which time the reaction mixture darkens somewhat, and ethyl chloride is collected in the "Dry Ice" trap. Distillation of the reaction mixture yields the diethyl ester of phosphonoacetonitrile, b. 127° C.–131° C./3 mm., $n_D^{20}$ 1.319.

*Analysis*

Found: P, 17.67%; N, 7.41% (by Dumas), 7.91% by Kjeldahl.

Theory for

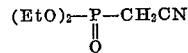

P, 17.51%; N, 7.91%

(b) *Cyanoethylation of 1(a)*:—To a mixture of 35.4 grams (0.2 mole) of the product of 1 (a), 20 grams of tertiary butyl alcohol, and 1 cc. of a 35% solution of trimethylbenzylammonium hydroxide in methanol, was added slowly 21 grams (0.4 mole) of acrylonitrile, with stirring. The reaction is exothermic, and the temperature is maintained within the range 35° C.–50° C. by adjusting the rate of addition of by cooling the reaction vessel with tap water. After the addition is complete the mixture is allowed to cool to room temperature, whereupon it solidifies to a crystalline mass. The solid is broken up, slurried twice with 100 ml. of ice water, filtered and air dried. There is thus obtained 52 g. of a white crystalline solid, the diethyl ester of bis(beta - cyanoethyl) phosphonoacetonitrile, which, recrystallized from water, m. 75° C.–76° C.

*Analysis*

Found: N, 14.84%; P, 11.42%.
Theory for
$(C_2H_5O)_2POC(CN)(CH_2CH_2CN)_2$: N, 14.84%; P, 10.95%.

EXAMPLE 2

To a mixture of 33.6 grams (0.15 mole) of

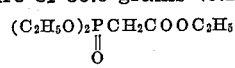

15 cc. of tertiary butyl alcohol and 1 cc. of 35% methanolic ammonia hydroxide, 16 grams (0.3 mole) of acrylonitrile is slowly added, with stirring, during the course of about one-half hour. The temperature of the reaction mixture is maintained within the range 40° C.–50° C. by cooling as required. After the reaction is complete, it is left standing at room temperature for three hours, then sufficient hydrochloric acid is added to make the reaction mixture just acid to litmus. The reaction mixture is then concentrated in vacuo, to produce 43.7 grams of pale amber-colored liquid residue, the triethyl ester of bis(beta-cyanoethyl)phosphonoacetic acid.

*Analysis*

Found: P, 9.67%; N, 8.12%.
Theory for

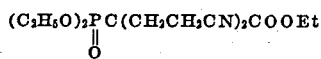

P, 9.33%; N, 8.48%.

Having thus described my invention, what I claim and desire to protect by Letters Patent is:

1. A process which comprises reacting two molecular proportions of acrylonitrile with one molecular proportion of a fully esterfied alkyl ester of an acid selected from the class consisting of phosphonoacetic acid, and phosphonoacetonitrile.

2. Trialkyl esters of phosphonobis-(beta-cyanoethyl)acetic acid.

3. Dialkyl esters of phosphonobis-(beta-cyanoethyl)acetonitrile.

ELBERT C. LADD.

REFERENCES CITED

The following references are of record in the file of this patent:

UNITED STATES PATENTS

| Number | Name | Date |
|---|---|---|
| 2,503,245 | Coover | Apr. 11, 1950 |
| 2,557,805 | Upson | June 19, 1951 |

OTHER REFERENCES

Nylen, Ber. Deut. Chem., vol. 59, page 1126 (1926). (Entire article, pages 1119 to 1128.)

Nature, vol. 167, issue No. 4,260, page 1035, June 1951.